April 16, 1968         R. G. STACY         3,378,117
VENTILATED DISC BRAKE ASSEMBLY
Filed Nov. 9, 1966
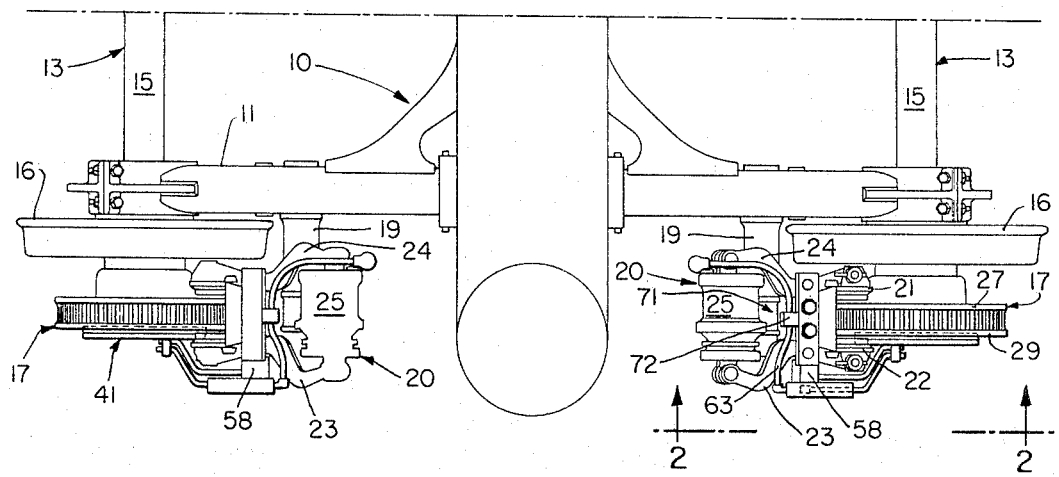
Fig.1
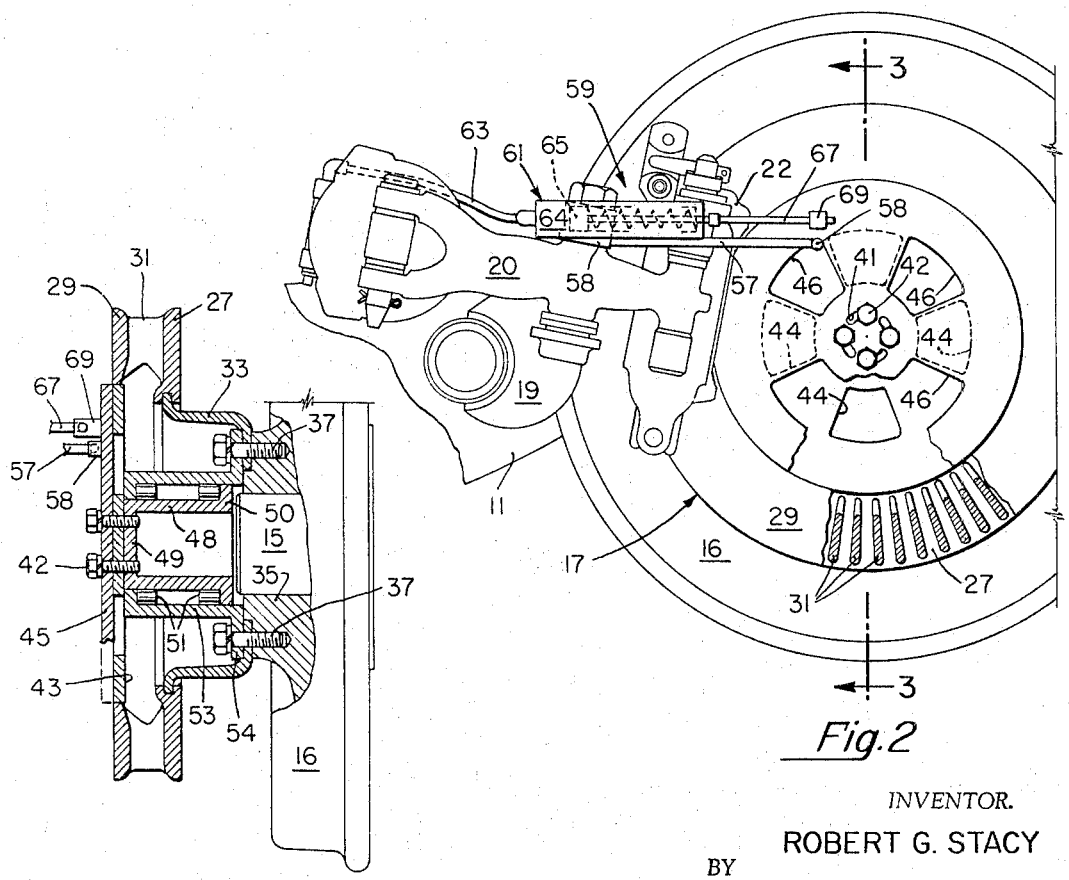
Fig.3                              Fig.2
INVENTOR.
ROBERT G. STACY
BY
AGENT United States Patent Office 3,378,117
Patented Apr. 16, 1968

3,378,117
VENTILATED DISC BRAKE ASSEMBLY
Robert G. Stacy, Meadowbrook, Pa., assignor to The Budd Company, Philadelphia, Pa., a corporation of Pennsylvania
Filed Nov. 9, 1966, Ser. No. 593,060
4 Claims. (Cl. 188—264)

ABSTRACT OF THE DISCLOSURE

A ventilated brake disc with closure plates at the air intake area which can be rotated in relation to each other to control the amount of air flow generated by the rotating disc. A bearing housing supported from a stationary member is provided to mount the closure plates, one of which is stationary and the other movable. A torque rod is secured to the stationary plate and a pneumatic activating device is connected to the movable plate. A delayed release is arranged to cooperate with the activating device to permit the air flow to continue during acceleration or running after a brake application for stop or slowdown, this being required to permit the disc to rapidly dissipate the heat that was generated during braking.

---

This invention relates to improved ventilated disc brake apparatus for railway cars, and more particularly, to such apparatus for controlling the air flow through such ventilated discs.

It has been found that the energy required to produce high volumes of air moving through a ventilated brake disc is significant at speeds above 100 m.p.h. At speeds up to 160 m.p.h. as contemplated on the present New York-Washington high-speed passenger railroad projects, the energy required would be significant. High volumes of air therefore are required to obtain maximum steady state thermal capacity and minimum cool down time for the most frequent duty cycle. High thermal capacity and rapid cooling characteristics plus a sufficient mass for tenable single stop performance result in the most efficient disc. When the choice and proper use of brake shoe friction materials are added to these attributes they produce a maximum capacity brake. These capabilities establish the level of the deceleration rate of the car and the frequency of brake applications that can be obtained.

In contrast to these basic principles a solid disc as distinguished from a ventilated disc requiring less horsepower to rotate, could have sufficient mass for a single stop at an acceptable deceleration rate but its steady state thermal capacity and heat dissipating capability are totally inadequate for the high speed services alluded to.

It is therefore the principal object of this invention to provide an improved disc brake apparatus which avoids one or more of the disadvantages of the prior art arrangements.

It is a further object of this invention to provide an improved disc brake apparatus which controls the air flow through the disc during the time braking forces are applied to the disc, and during its running operation thereof.

In accordance with the invention, a conventional ventilated brake disc assembly is mounted on a well known wheel and axle unit of a truck or shaft of a machine for industrial use. The disc assembly includes a pair of circular discs which are disposed on an axle or shaft and separated by a plurality of fins. Closure means are provided adjacent the air intake area of the disc assembly. Closure control means are provided to monitor the air flow generated between the inboard and outboard discs to govern the amount of horsepower required to drive the disc assembly as required at the various speed ranges and braking demands.

For a better understanding of the invention, together with other and further objects thereof, reference is had to the following description taken in connection with the accompanying drawing and its scope will be pointed out in the appended claims.

In the drawing:

FIG. 1 is a top plan view of a railway passenger car truck embodying the invention;

FIG. 2 is a side elevational view, along the line 2—2 of FIG. 1; and

FIG. 3 is a vertical sectional view taken along the line 3—3 of FIG. 2.

Referring now to the drawings, the invention is illustrated as applied to a railway passenger car truck 10 having a pair of side frames 11, which in turn are supported by a pair of wheel axle units 13. Each of these units comprise an axle 15 and a pair of laterally spaced wheels 16. The truck may be similar to the configuration described and claimed in the patent to W. B. Dean, entitled "Railway Car Truck" filed Oct. 13, 1959, Patent No. 2,908,230, and assigned to the same assignee as the present invention.

Each wheel 16 of axle unit 13 has associated therewith a ventilated brake disc assembly 17 fixedly secured to the hub mounted on truck side frame 11, a bracket assembly 19, supporting a unit brake assembly 20, comprising brake shoe 21, 22, a pair of brake tongue levers 23, 24 and a brake actuator 25. The brake shoes 21, 22 engage disc assembly 17 which includes a pair of annular face discs 27 inboard, 29 outboard, connected in spaced apart relationship by a plurality of cooling fins 31 extending therebetween. The fins 31 are flat, and are radially spaced to provide a plurality of air passages between the fins, through which air flows to cool the fins and the discs. A flanged hub plate 33 connected at its outer periphery to inboard disc 27 is secured at its inner periphery to the hub 35 of wheel 16 by bolts 37 in a manner to rotate the disc faces 27, 29 at right angles to the axis of axle 15. The hub plate prevents air from coming in from the side of the disc face 27 and flowing through fins 31 and discs 27, 29. Normally the energy required to produce a flow of moving air through the ventilated disc assembly 17 is relatively insignificant at slow speeds; however, at high r.p.m. the energy required to obtain maximum thermal capacity and minimum cool down time for the most frequency duty cycle of brake application becomes significant.

In accordance with the invention, air flow control means 40 are provided to govern the amount of horsepower required to drive the ventilated disc assembly 17 as required at various speed ranges and braking demands. For this purpose a pair of closure plates 43, 45 are concentrically disposed relative to outboard annular disc 29. Plate 43 includes a plurality of radially spaced spoke holes 44 and plate 45 includes a like plurality of holes 46. In one position of relative rotation between the plates air is precluded from flowing through the holes and through the brake disc assembly 17. When however, the plates are rotated relative to one another, holes 44 and 46 may be aligned so as to permit air flow therethrough. Plate 45 is mounted for rotation in side facing engagement with plate 43 by means of a suitable pin-slot connection. In the present instance, plate 45 includes a plurality of radially spaced arcuate slots 41 near its center. A like plurality of headed studs 42 are passed through the slots and are received in plate 45. Closure plate 43, disposed inboard of plate 45, includes an inner bearing sleeve 48 having a base 49 affixed to the inboard face of the closure plate 45, and outwardly turned flanges 50 at its other end. Bearings 51 enable rotation of outer bearing sleeve 53, relative to inner bearing sleeve 48. The outer sleeve includes an out-turned flange 54 serving to secure it to hub 35 of wheel 16 by the aforementioned bolts 37. The inboard end of the sleeve includes an in-turned flange 55 terminating adjacent the inner face of inner closure plate 43.

As seen in FIG. 2, inner closure plate 43 is maintained in a stationary or non-rotative position relative to the rotation of wheel 16, brake disc assembly 17, and with respect to outboard closure plate 45. Rotation of the plate is prevented by means of torque rod 57 affixed at one end to a swivel bolt 58, connected to plate 43. As seen in FIG. 2 the swivel bolt projects through aperture 46 in plate 45. The other end of the torque rod 57 is fixed to supplemental bracket 58 which secured to brake assembly 20. When the closure plates 43, 45 are in air-blocking relationship, the energy required to rotate the disc assembly 17 would be that equivalent to its mass as a simple flywheel. This condition would normally prevail during extreme high speed operation of the railway passenger car or machine to minimize horsepower drain required to rotate the ventilated brake disc assembly.

In order to admit air within the brake disc assembly 17, actuator means 59 are provided to rotate outer closure plate 45 relative to inner plate 43 which is held stationary by means of the aforementioned torque rod 57. The actuator means 59 in the present form of the invention comprises a pneumatic cylinder means 61 provided with an air supply at one end through hose 63. Cylinder means 61 comprise a cylindrical casing 64 having a piston 65 movable therein. The latter piston is suitably connected to one end of push-pull rod 67. The other end of the push-pull rod is suitably inwardly offset and is connected to a bracket pivot 69 secured to the outer peripheral face portion of plate 55. Upon application of a braking action on the part of the operator of the passenger car to set the brakes, the brake assembly is caused to move the braking shoes 21, 22 into frictional engagement with the disc faces 27, 29 of ventilated brake disc assembly 17. At the same time, actuator means 59 are activated to cause piston 65 to move rod 67 to the right. This motion causes rotation of plate 45 so that its apertures 46 are in overlapping alignment with apertures 44 within stationary closure plate 43, to thereadmit cool air to the brake assembly.

A delayed release means 71 may be included as part of the apparatus of this invention to permit the airflow through the disc assembly 17 to continue during acceleration or running after a brake application for stop or slow down. In the present instance a pneumatic actuated valve means 72 are shown incorporated in hose line 63 and affixed to the top of aforementioned supplemental bracket 58 carried by bracket assembly 21. The valve means 72 may be of well known construction to enable retention of rotatable plate in an open position for a predetermined period of time. The open position of plate 45 is required to permit flow of air through plates 43, 45 to thereby permit the disc assembly 17 to rapidly dissipate the heat that was generated during the application of the brakes. The aforementioned time delay release means 72 will thus produce the maximum brake duty cycle and prevent untenable compounding of brake disc temperature if frequent braking applications are required.

It should be noted that intakes posts 46, 44 may be varied in size and configuration dependent upon axle diameter and related elements. Thus, if more intake area is required, the plates 43, 45 may be of cone or drum shape. This would enable a greater airflow compared with the planar plates 43, 45 shown.

While there has been described what at present is considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A disc brake mechanism for controlling the flow of air through a ventilated rotatable brake disc, comprising, a flange mounting attached to one side of said ventilated disc and forming a closure therewith, the side opposite said closure being open, a first closure plate having openings therein mounted in the open end of said ventilated disc, means connected to said first closure plate for securing the same against rotation, a second closure plate having openings therein and aligned juxtaposed the apertures in said first closure plate, means connected to said second closure plate and movable in one direction for rotating said second closure plate so that its openings are aligned with the openings in said first closure plate to thereby enable flow of air through the open side of said disc, said last named means being movable in an opposite direction to cause said second plate to block the flow of air through the openings in said closure plate and time delay release means associated with said last named means to retard movement thereof in said opposite direction for a predetermined period of time.

2. A disc brake mechanism as set forth in claim 1 wherein said means connected to said second closure plate comprises a pneumatic cylinder and piston means having a rod connected to said second closure plate.

3. A disc brake mechanism as set forth in claim 1 which further includes bearing support means secured interiorly of said ventilated brake disc for supporting said first and said second closure plates.

4. A disc brake mechanism as set forth in claim 3 wherein said bearing support means comprises a pair of sleeves and bearings interposed therebetween for fixedly mounting said first closure plate relative to said rotatable ventilated disc.

References Cited

UNITED STATES PATENTS

| 2,198,027 | 4/1940 | Farmer | 188—264 |
| 2,198,028 | 4/1940 | Farmer | 188—264 |

MILTON BUCHLER, *Primary Examiner.*

G. HALVOSA, *Assistant Examiner.*